United States Patent
Neff et al.

(10) Patent No.: US 8,567,571 B1
(45) Date of Patent: Oct. 29, 2013

(54) FRICTION RAIL SKATE

(75) Inventors: Scott Edward Neff, Broken Arrow, OK (US); Jerry L. Lockridge, Tulsa, OK (US); Wendell M. Scott, Broken Arrow, OK (US)

(73) Assignee: L&M Pattern Manufacturing Company, Inc., Tulsa, OK (US)

( * ) Notice: Subject to any disclaimer, the term of this patent is extended or adjusted under 35 U.S.C. 154(b) by 94 days.

(21) Appl. No.: 12/984,510

(22) Filed: Jan. 4, 2011

(51) Int. Cl.
*B61H 13/00* (2006.01)

(52) U.S. Cl.
USPC ............... 188/36; 188/62; 104/259; 104/260

(58) Field of Classification Search
USPC .......... 188/33, 35, 36, 62, 107, 4 R; 104/259, 104/260; 16/267, 268, 269
See application file for complete search history.

(56) References Cited

U.S. PATENT DOCUMENTS

| | | | |
|---|---|---|---|
| 842,679 A | 1/1907 | Martin | |
| 1,598,741 A | 9/1926 | Nelson | |
| 2,170,523 A * | 8/1939 | Wilcox | 104/260 |
| 2,874,645 A * | 2/1959 | Beck | 104/260 |
| 2,935,030 A * | 5/1960 | Hayes | 104/259 |
| 2,945,454 A * | 7/1960 | Beck | 104/259 |
| 2,945,455 A * | 7/1960 | Beck | 104/259 |
| 3,015,724 A * | 1/1962 | Jefferson | 246/182 A |
| 3,027,851 A | 4/1962 | Hayes | |
| 3,096,729 A * | 7/1963 | Beck | 104/260 |
| 3,128,723 A * | 4/1964 | Smith | 104/260 |
| 4,216,724 A | 8/1980 | Grillet | |
| 4,498,561 A | 2/1985 | Sanders | |
| 5,211,266 A * | 5/1993 | Meyer | 188/62 |
| 6,978,865 B2 | 12/2005 | Fougere | |

FOREIGN PATENT DOCUMENTS

| | | | |
|---|---|---|---|
| EP | 217382 A | | 4/1987 |
| EP | 217382 A * | | 4/1987 |

OTHER PUBLICATIONS

Western-Cullen-Hayes, Inc, Product Information—Friction Rail Skate [online], [retrieved Nov. 18, 2010], retrieved from the Internet ,<URL: http://www.wch.com/railskate.htm>, pp. 1-2 showing fabricated rail skate and describing operation of friction rail skates, materials, and dimensions.

The Nolan Company, Rail Products for Railroads, Industry, Mines and Quarries, Rail Skates [online], [retrieved Nov. 18, 2010], retrieved from the Internet <URL:http://www.nolancompany.com/main/railskates/railskates.asp>, p. 1 describing three styles with materials and weight.

Leonard Keen, Recollections of Gibson Yard Operations [online], [retrieved Nov. 18, 2010], retrieved from the Internet, <URL: http://www.dhke.com/ibharchive/keen.html>, p. 2 last paragraph describing a wheel skate.

Sharpe Safety Supply, Inc., Rail Skids [online], [retrieved Nov. 18, 2010] Retrieved from the Internet <URL: http://www.sharpesafety.com/catalog/product-display.php3?ID=470>, p. 1 describing Rail Skids or "Skates."

(Continued)

*Primary Examiner* — Robert A Siconolfi
*Assistant Examiner* — Charles Poon
(74) *Attorney, Agent, or Firm* — The Overton Law Firm, P.C.; Tommy D. Overton, Jr.

(57) ABSTRACT

A friction rail skate comprising a base having a guide portion for supporting and steering along a rail and a tongue where the base is detachably connected to the tongue.

45 Claims, 11 Drawing Sheets

(56) References Cited

OTHER PUBLICATIONS

Modular Access Systems, LLC, Rail Skids and Rail Skates [online], [retrieved on Nov. 18, 2010], retrieved from the internet, <http://www.mobile-loading-platforms.com/ProductDetail.aspx?Catalog=Rail% 20Skids&Item=4016-12&c=1>, p. 1 describing rail skids.

Modular Access Systems, LLC, Rail Skids [online], [retrieved Nov. 18, 2010], retrieved from the Internet<URL: http://www.rail-chocks.com/Products.aspx?Type=Rail%20Skids>, p. 1 showing rail skates and providing weights.

Western Safety Products, Rail Skids [online], [retrieved Nov. 18, 2010], retrieved from the Internet, <URL: http://www.westernsafety.com/aldon2010/aldon2010pg2.html>, p. 8 describing operation, replacing skids when tongue is curled or broken, showing models, and providing weights; p. 9 showing models and providing weights.

Mohammad Hassan Esmaeili and Sadegh Tokhmechain, Full Securing of the stopped trains at stations as unavoidable necessity [online], [retrieved on Nov. 18, 2010], retrieved from the Internet, <URL: www.intlrailsafety.com/CapeTown/5_Tokhmechian.doc> p. 8 discussing kinds of rail skids; p. 10 showing rail skids and stops; p. 11-13 showing rail skids and providing calculations for number of required rail skids to restrain a train.

Railroad Tools and Solutions (LLC), Wheel Chocks and Rail Skates [online], [retrieved Nov. 18, 2010], retrieved from the Internet, <URL: http://www.rrtoolsnsolutions.com/trackAccessories/WheelChocksAndRailSkates.asp> p. 5-6 showing styles of skates and weights.

Western Safety Products, Rail Skids [online], [retrieved Nov. 19, 2010], retrieved from the Internet, <URL:http://www.westernsafety.com/nolan2010/nolanpg3.html>, p. 12-13 showing models and providing weights.

American Society for Testing and Materials, A897/A897M-06 Standard Specification for Austempered Ductile Iron Castings, Current edition approved Nov. 1, 2011. Published Apr. 2012. Originally approved in 1990. Last previous edition approved in 2006 as A897/A897M-06.

American Society for Testing and Materials, A897/A897M-03 Standard Specification for Austempered Ductile Iron Castings, Current edition approved Feb. 1, 2006. Published Feb. 2006. Originally approved in 1990. Last previous edition approved in 2003 as A897/A897M-03.

Society of Automotive Engineers, SAE J434 Surface Vehicle Standard for Automotive Ductile (Nodular) Iron Castings, current edition. Originally issued Sep. 1956. Last previous issue Feb. 17, 2004.

\* cited by examiner

FRICTION RAIL SKATE

CROSS REFERENCE TO RELATED APPLICATIONS

Not Applicable.

FEDERALLY SPONSORED RESEARCH

Not Applicable.

SEQUENCE LISTING OR PROGRAM

Not Applicable.

BACKGROUND OF THE INVENTION

1. Field of the Invention

This present invention relates to friction rail skates. More specifically, the present invention relates to a friction rail skate positioned on a rail to disengage a railcar wheel from the rail, support the railcar wheel, and to frictionally slide along the rail under loads transmitted to the rail skate causing the railcar to slow and stop.

2. Description of the Related Art

Friction rail skates have been known for many years. Such friction rail skates are fabricated or cast as a single rigid body and commonly include a toe, lifter, or entry portion designed so that a railcar wheel will roll onto the rail skate until the railcar wheel engages an upwardly inclined ramp. Upon the railcar wheel becoming engaged with the rail skate, the momentum of the railcar will cause the rail skate to frictionally slide along the rail. Ultimately, the railcar will be stopped as a result of the rail skate frictionally sliding along the rail.

Various devices have been employed that use friction forces between the device and the rail it rests on to stop a railcar. Some of these have been set forth in U.S. patents. U.S. Pat. No. 842,679 sets forth a safety street-car brake intended for use as an emergency-brake should the motorman or operator of a car lose control of the same upon a declivity or sharp grade that employs shoes which are normally supported above the rails over which the car the travels, said shoes being quickly released by the motorman of a car to permit them descending to the rails where the wheels ride upon the shoes and cause a gradual retardation in the movement of the car, which eventually stops. U.S. Pat. No. 3,027,851 sets forth a device which engages the wheels of a railcar and stops it in which the weight of the car is first utilized to retard its movement and, if this is not sufficient, in which the car is stopped by an additional stop means located on the track. U.S. Pat. No. 4,498,561 sets forth a retractable wheel chock assembly for railway wagons that comprises the combination of a wheel chock designed to act on the flange of a wagon wheel, and a friction brake attached to the wheel chock and sliding along a guide rail mounted just outside the railway track on which the wagon is running U.S. Pat. No. 5,211,266 sets forth a rail skate where the shoe member has a longitudinal linear break that forms a line along its center to form a substantially V-shaped cross-section comprising a central high point and depending side portions produced substantially entirely from fabricated steel, and the shoe member is preferably formed of high strength, low alloy steel having a high yield strength. U.S. Pat. No. 6,978,865 sets forth a wheel-blocking device and in particular a safety chock for large wheeled vehicles and the chock may be also used as an emergency braking device at low speeds, similar to a rail skate but more efficient.

U.S. Pat. No. 5,211,266 discloses that a problem with known rail skates has been the bending or curling up of the toe portion of the rail skate due to heating of the underside thereof caused by the friction between the rail skate and the rail as the rail skate slides along the rail under the substantial weight of the railcar. The resultant heating of the underside of the toe portion of the rail skate causes that underside to expand, and as a result the toe portion of the rail skate has a tendency to curl up. If significant upward curling of the toe portion occurs, the rail skate can be rendered useless because a railcar wheel will not properly roll up onto the toe portion. It is well known that rail skates or skids are replaced when the toe portion is curled or broken.

U.S. Pat. No. 5,211,266 also discloses that prior art rail skates have been made substantially heavier in an attempt to reduce the above curling effect and provides a shoe member extending the entire length of the rail skate formed with a linear or longitudinal break to achieve a substantially V-shaped cross-section so as to distribute the heat to the two sides of the underside of the toe portions and, at the same time, increase the resistance of the toe portion to upward curling or bending. More specifically, the substantially V-shaped cross-sectional configuration extends the full length of the shoe element, including, in particular, throughout the length of the toe section which is the portion that is normally subject to upward curling due to heat generated during the sliding of the shoe on a rail.

The prior art has a number of shortcomings. Generally, the prior art thickens and changes or modifies the transverse cross-sectional shape of a rail skate and toe portion and teaches that a rail skate is fabricated or cast as a single rigid body. The prior art also does not provide a transverse division of the cast or fabricated single rigid body of a rail skate. Prior art rail skates art are not separable or provided with a replaceable or an interchangeable tongue to accommodate different wheel diameters. More specifically, U.S. Pat. No. 5,211,266 sets forth a rail skate fabricated as a single unit by rigid welds that continues to result in waste because it is not manufactured as a separate base and tongue where the base may be reused with a replacement or interchangeable tongue. Moreover, the prior art does not combine the benefits of a base and tongue that can be cast and assembled without any machining or welding.

3. Summary of the Invention

Accordingly, a need has arisen for a rail skate that overcomes the deficiencies in the prior art. Generally, in accordance with one embodiment, the present invention provides a rail skate that combines a base and tongue that may be easily assembled or dissembled with a mechanical connection. Specifically, the present invention provides a transverse division of the prior art rail skate into a base and tongue, and a system for making the base and tongue easily detachably connected or interlocked. Advantageously, the present invention provides a system for connecting the base to the tongue without thickening the toe portion and without requiring a special cross section to resist bending, curling, or breakage.

Accordingly, an object of the present invention is to provide a rail skate with a base and a tongue that can be easily manufactured and assembled without any additional machining or welding. It is also an object to make a rail skate that can be easily disassembled. In one embodiment of the present invention, the conventional rail skate is manufactured in two (2) cast parts: 1) a base and 2) a tongue. The base and tongue are detachably connected with a mechanical connection comprised of a hitch in cooperation with a receiver along with a post in cooperation with a wall and a receptacle. This mechanical connection is maintained under loads of a railcar wheel and improves contact between the rail and rail skate and minimizes structural bending of the rail skate.

Manufacturers, rail road employees, and others will find the present invention advantageous. Railroad yardmen will be provided with a lighter rail skate that may be hand carried as a base and a tongue. Railroad yardmen will also find that present invention offers configurations where no separate tools are required to assemble or disassemble the rail skate. Moreover, safety is an important aspect and operators and companies will find that making the rail skate where it can be easily disassembled reduces the risk of lifting injuries. Operators will not only find the present invention safer, but will find it more cost effective because it provides the tongue as a wear part that can be easily replaced. Rail road operators and companies will find that present invention is attractive from a cost perspective because unlike the prior art the base is reusable and the tongue is replaceable and interchangeable. Operators will also find the present invention cost effective because the base that may be interchanged with tongues of different configurations that accommodate rail car wheels of different sizes.

The present invention is also cost advantageous over the prior art. Specifically, the mechanical connection comprised of a hitch in cooperation with a receiver along with a post in cooperation with a wall and a receptacle does not require any alteration from the foundry and may be shipped direct to the end user saving the intermediate transportation and labor costs.

In addition to providing a detachably connected base and tongue, the present invention provides a modified ramp, incline, and toe portion of a rail skate; and converts the ramp into a cooling fin; and relocates the incline to the base. The cooling fin also advantageously relocates mass to an area to resist loads and reduce the size and weight of a rail skate while acting as a heat sink to dissipate heat from the tongue.

Other objects and advantages will become obvious to those skilled in the art from a review of the specification that other forms may be made within the scope of the invention.

BRIEF DESCRIPTION OF THE DRAWINGS

A better understanding of the invention can be obtained when the detailed description of exemplary embodiments set forth below is considered in conjunction with the attached drawings in which.

DETAILED DESCRIPTION OF THE EXEMPLARY EMBODIMENTS

Figure 1:
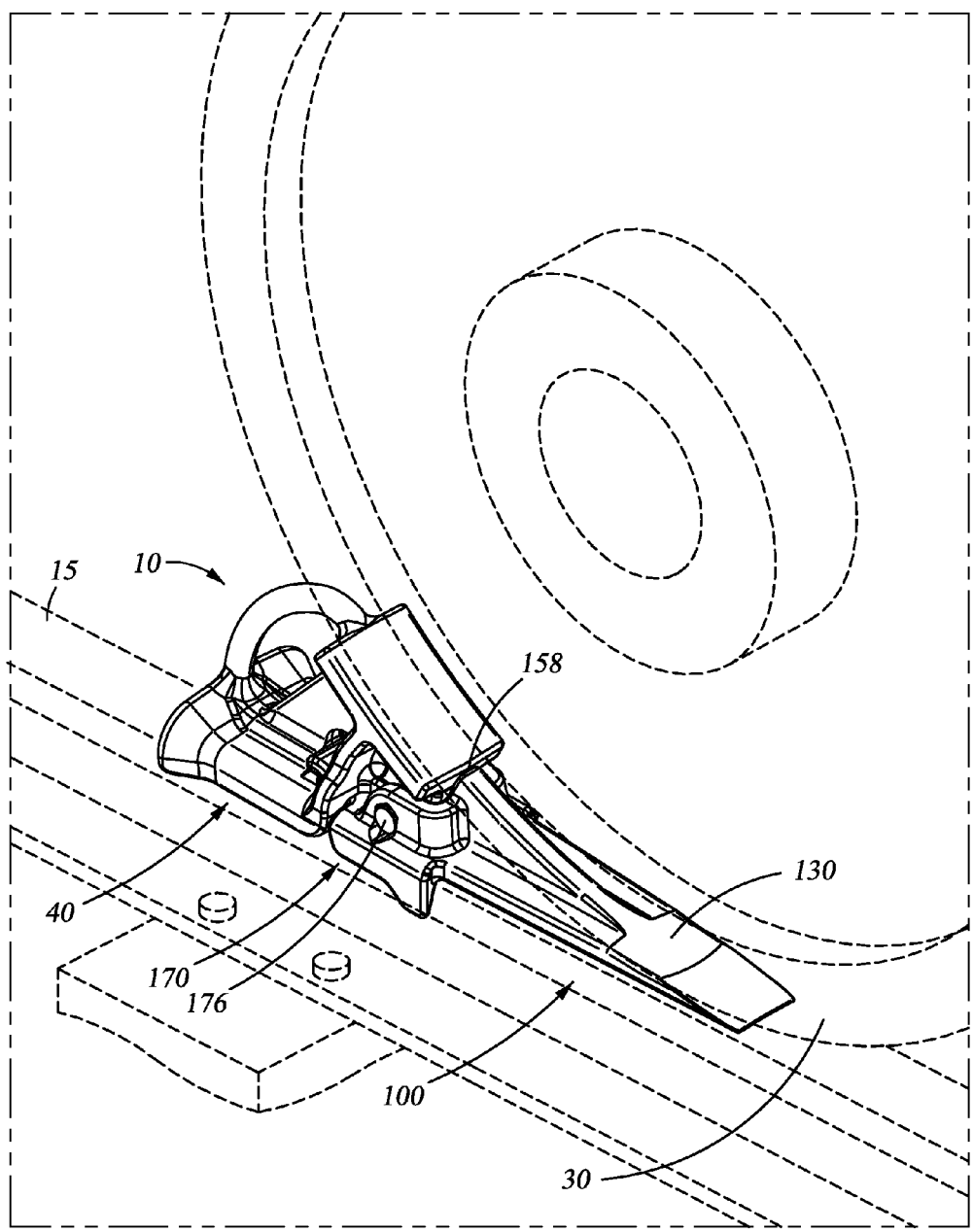
FIG. 1 is a perspective view of one embodiment of the present invention operatively positioned on a rail.

In accord with one embodiment of the present invention, a rail skate is 10 illustrated in FIGS. 1 through 8. FIG. 1 shows the rail skate 10 frictionally slidably mounted on a rail 15 engaged by a railcar wheel 30. Referring to FIG. 1, the rail skate 10 is comprised of a base 40, a tongue 100, and a connector means 170 for securely attaching the base 40 to the tongue 100.

Figure 2:
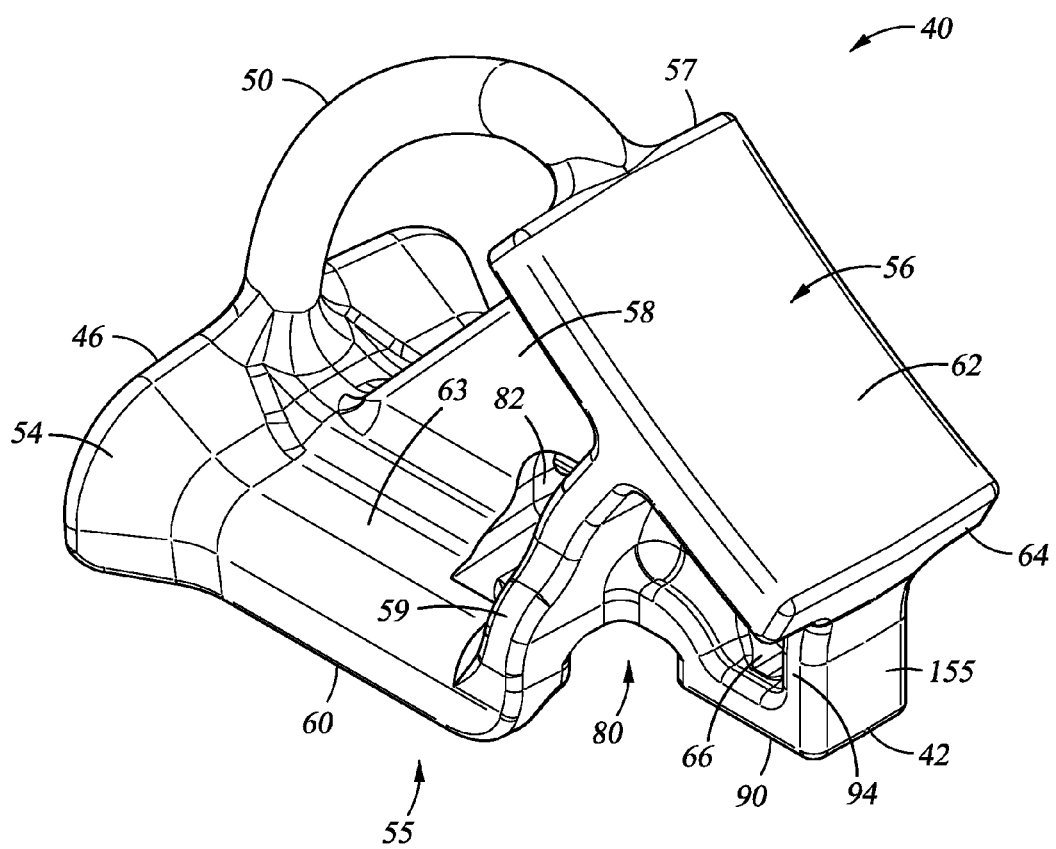
FIG. 2 is an isometric view of the base.
Figure 3:
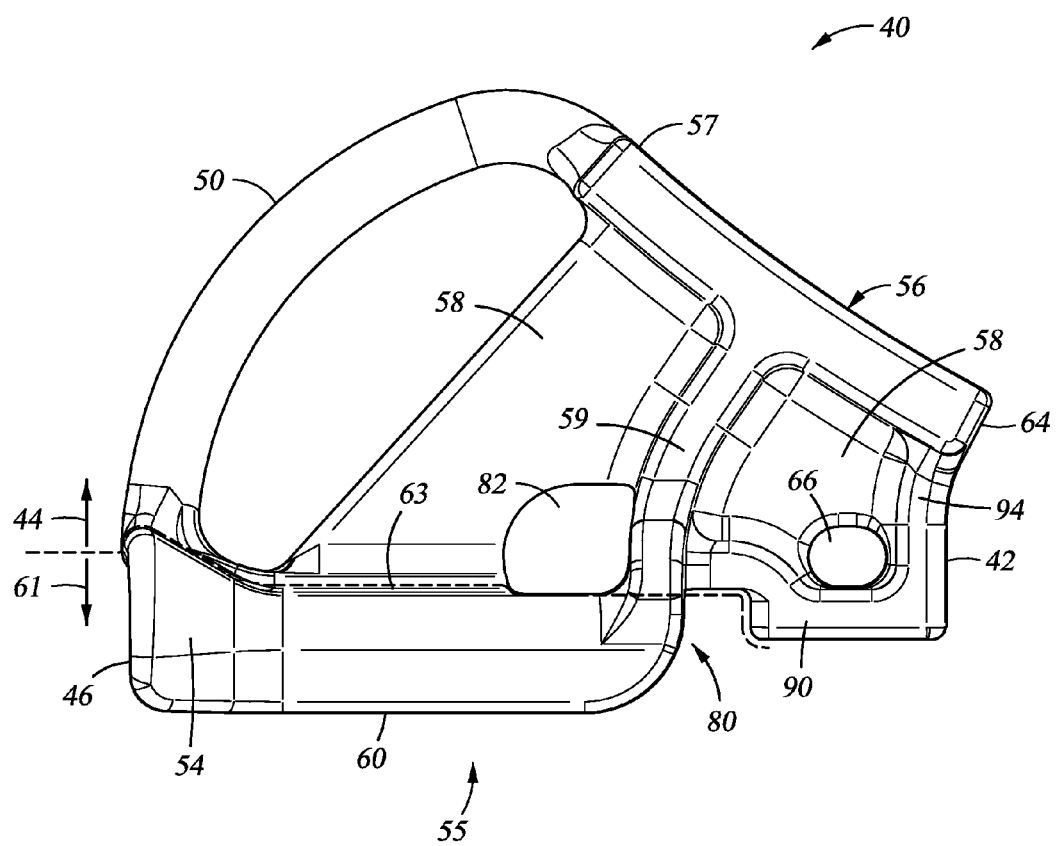
FIG. 3 is a side view of the base.
Figure 4:
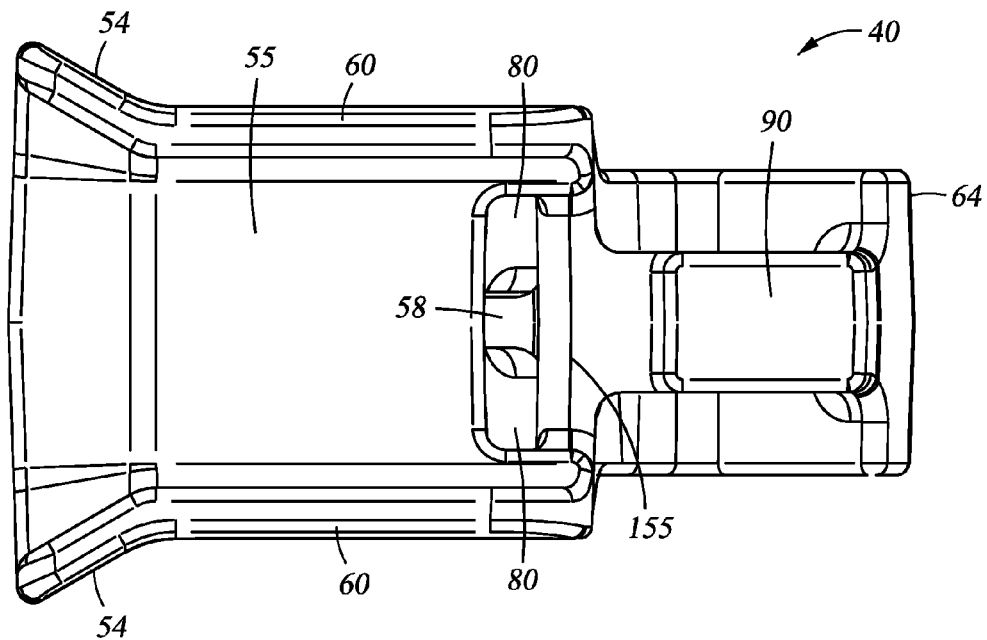
FIG. 4 is bottom view of the base.
Figure 5:
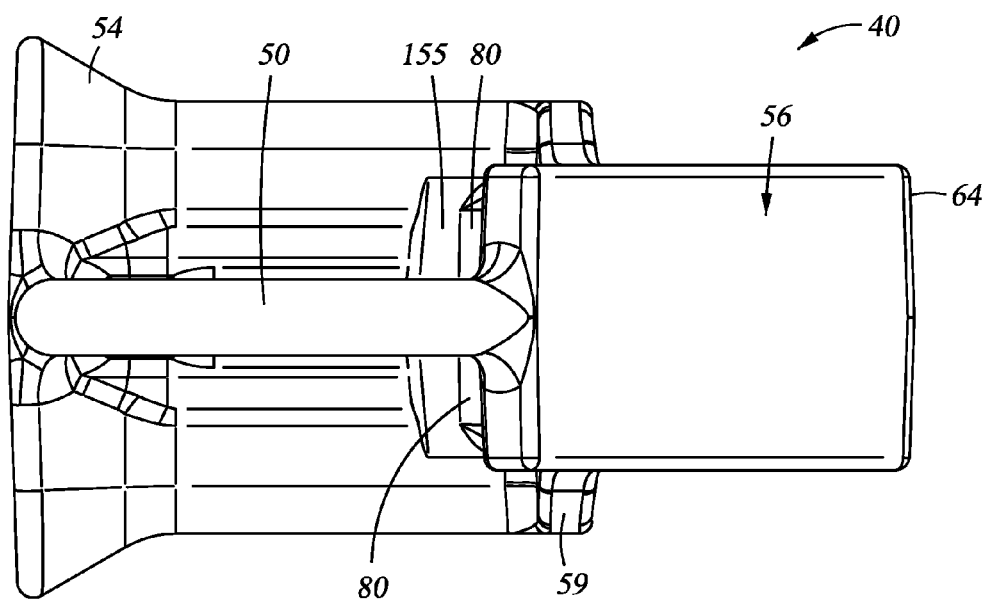
FIG. 5 is a top view of the base.
Figure 6:
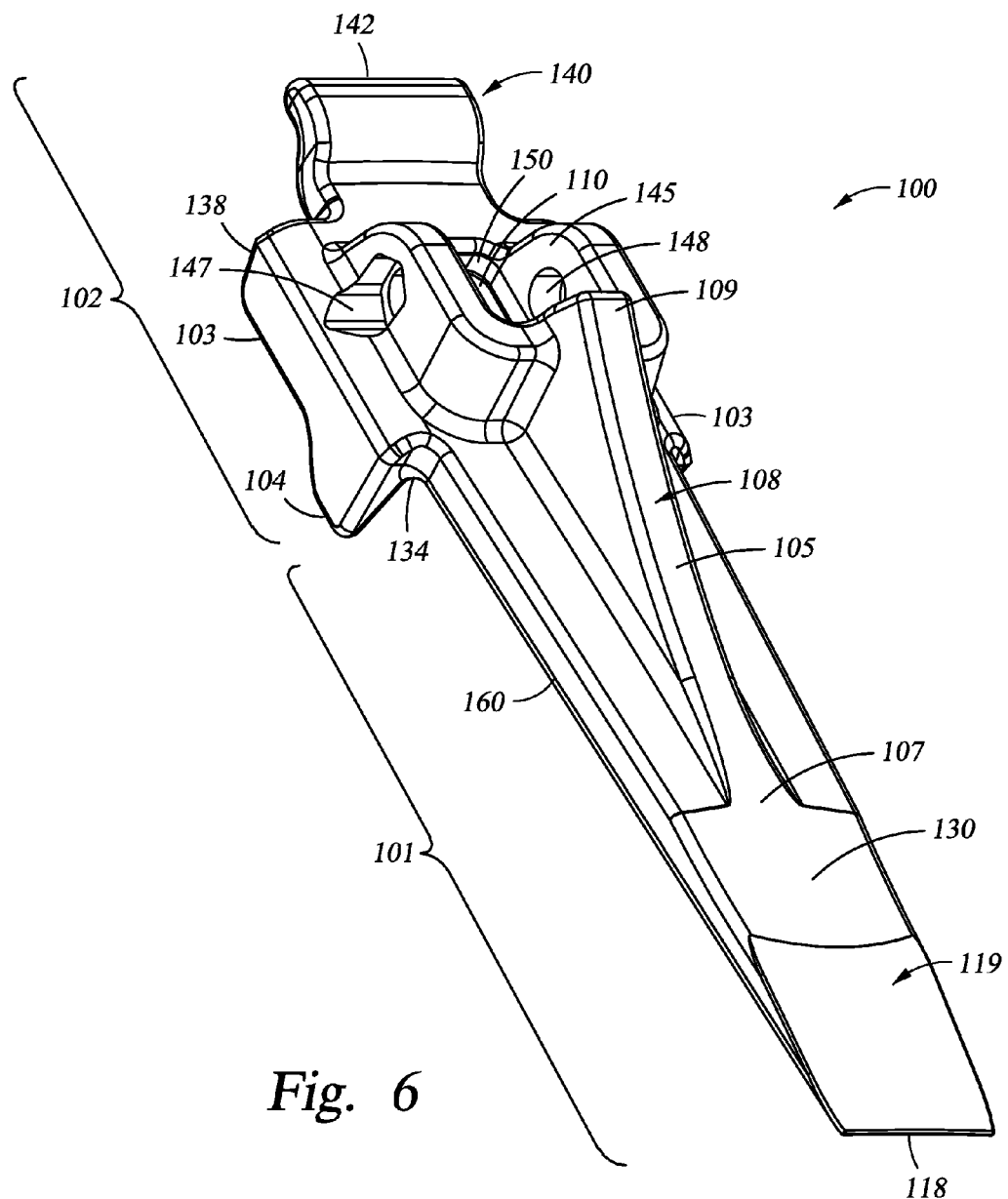
FIG. 6 is an isometric view of the tongue.
Figure 7:
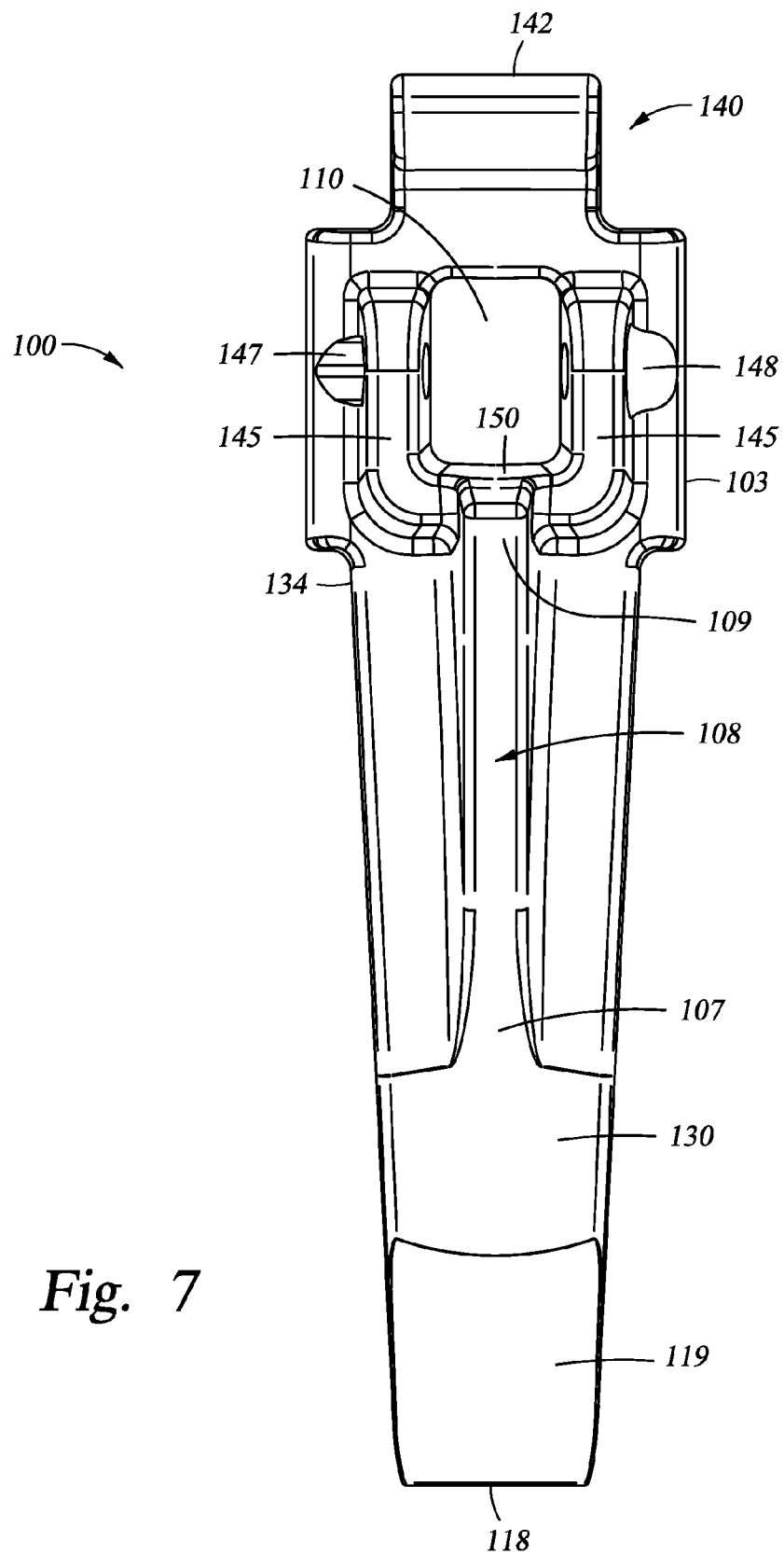
FIG. 7 is a top view of the tongue.
Figure 8:
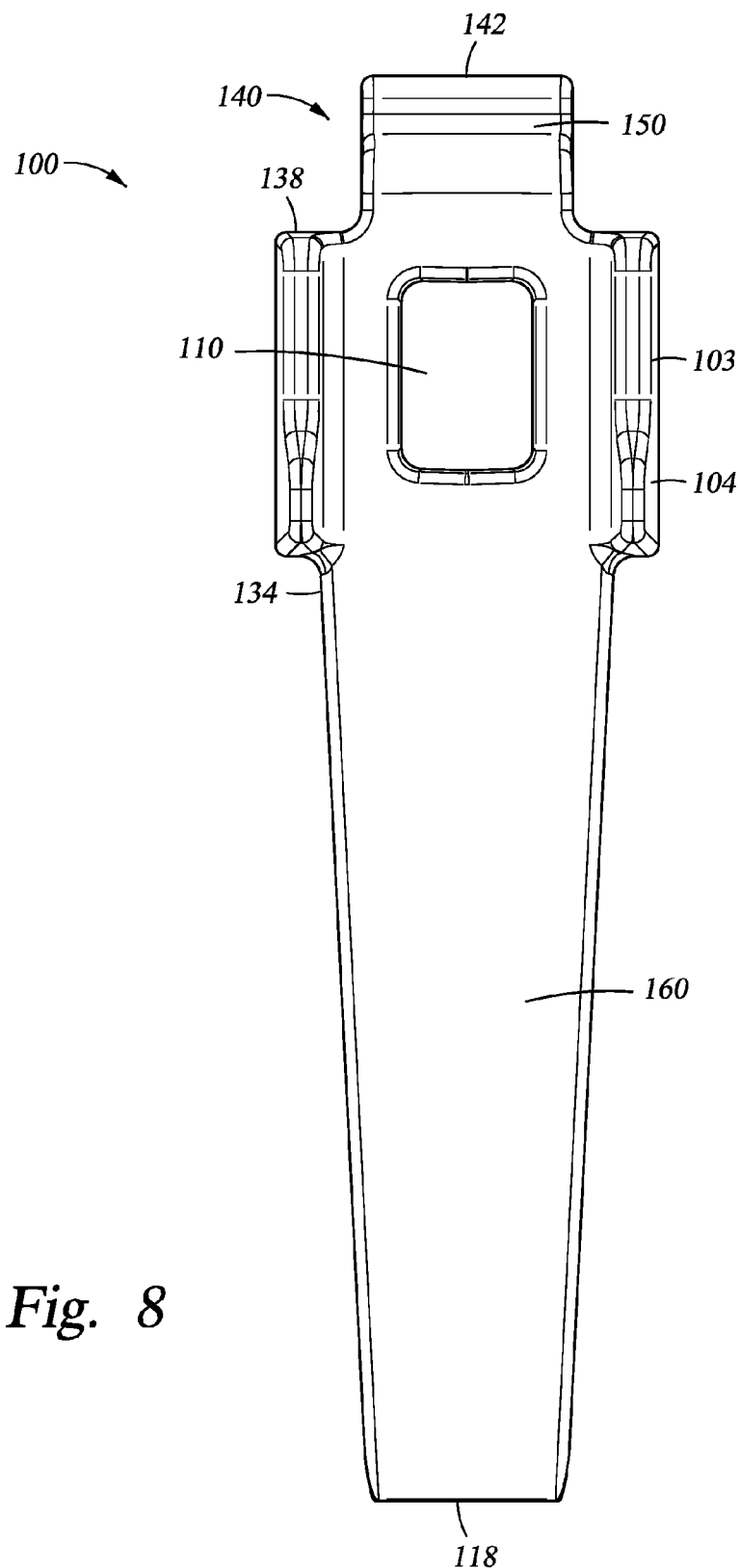
FIG. 8 is a bottom view of the tongue.
Figure 9:
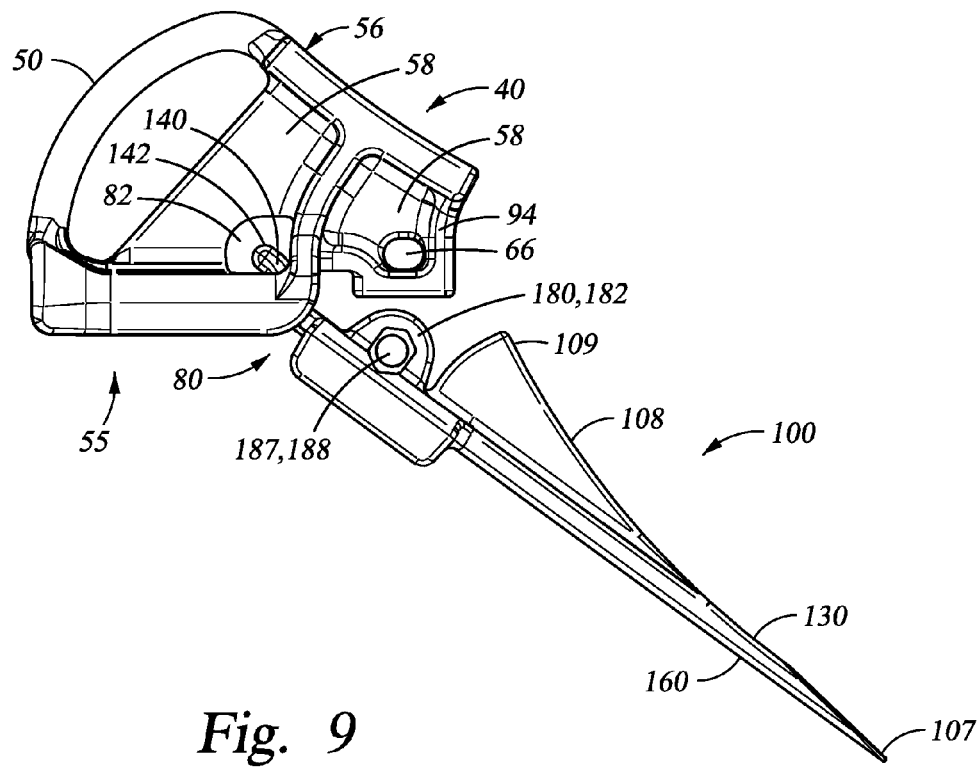
FIG. 9 is an assembly view of a second embodiment the present invention.

Referring to FIG. 3, the base 40 is comprised of a front end 42, a rear end 46, a guide portion 61, and a gusset connection portion 44. Referring to FIG. 3, the gusset connection portion 44 is mounted on top of and generally projects upward from the guide portion 61. The gusset connection portion 44 further comprises a gusset 58 having a first connector hole 66 and a gusset slot 82, an incline 56 mounted on top of and substantially perpendicular to the gusset 58, and a post 90. Referring to FIGS. 2, 3, and 4, the gusset 58 is mounted on top of a top plate 63 and supporting the incline 56 and the post 90. Referring to FIGS. 2 and 3, the gusset connection portion 44 may also include at least one pair of lateral supports 59. Referring to FIGS. 2, 3, and 4, the guide portion 61 further includes one pair of guides 60 and a flare 54 and the top plate 63 having a receiver 80. Referring to FIGS. 2, 3, and 4, the pair of guides 60 are mounted on opposite sides of the guide portion 61 substantially perpendicular to the top plate 63 and extend directionally opposite from the gusset connection portion 44. As shown in FIGS. 2, 3, and 4, a first friction surface 55 extends on the underside of the top plate 63 between the pair of guides 60 from the rear end 46 to the receiver 80 and the pair of lateral supports 59. The post 90 is formed in the gusset 58 and is attached to the gusset connection portion 44 and the guide portion 61 and extends downward from the gusset 58 and should be substantially flush with the first friction surface 55. Referring to FIGS. 2, 3, and 4, the flare 54 is formed in the rear of the guide portion 61 and should be one-quarter (¼) inch to one-half (½) inch wider than the outside of each of the pair of guides 60 and one-quarter (¼) inch to one-half (½) inch higher than the top plate 63. Referring to FIG. 2, the incline 56 further comprises a second friction surface 62, an incline top 57, and an incline bottom 64. Referring to FIGS. 2, 3, 4, 5, and 9, the receiver 80 is formed in the top plate 63 and cooperates with the gusset slot 82. The receiver 80 and the gusset slot 82 accept and cooperate with a hitch 140 formed in the tongue 100 as shown in FIG. 9. Referring to FIGS. 6, 7, and 8, the tongue 100 further comprises the hitch 140 having a distal end 142. The hitch 140 is provided with a reverse S-shaped configuration so that the distal end 142 of the hitch 140 is offset from the toe portion 101 as shown in FIGS. 6, 7, 8, and 9. Referring to FIG. 6, the hitch 140 is shown having a substantially reverse S-shape; however the hitch 140 may be of any shape that substantially matches the receiver 80. In FIGS. 2, 3, and 4, the post 90 has a substantially rectangular cross section. The post 90 may have any cross sectional shape, however the cross sectional shape of the post 90 must substantially match the shape of other components to detachably connect the base 40 to the tongue 100 shown in FIG. 1. Referring to FIGS. 2 and 3, the gusset connection portion 44 may also include a pair of post lateral supports 94 formed in the gusset connection portion 44 substantially perpendicular to the gusset 58 and formed on opposite sides of the gusset 58 between the incline 56 and the top plate 63 for stiffening the post 90. While the pair of post lateral supports 94 are shown in FIGS. 2 and 3 extending from the top plate 63 to the incline 56; the pair of post lateral supports 94 may partially extend from either the incline 56 or the top plate 63, not fully extending between the top plate 63 and the incline 56.

Referring to FIGS. 2 and 3, the base 40 may be stiffened to resist and support substantial loads. As shown in FIGS. 1, 2, 3, and 4, the gusset 58 may be formed integrally in the base 40 to support the incline 56. The gusset 58 may also be formed from a plurality of longitudinal stiffeners extending from the top plate 63 to the underside of the incline 56. The gusset 58 is formed between the top plate 63 and the incline 56 and extends to the front end 42 as shown in FIG. 3. The base 40 may be further stiffened by the opposing pair of lateral supports 59 formed substantially perpendicular to the gusset 58 and between the top plate 63 and extending under the incline 56. The pair of lateral supports 59 may be formed in any shape and may have a curvilinear shape as shown in FIGS. 2 and 3.

Referring to FIG. 3, the gusset 58 further comprises the first connector hole 66. In FIG. 3, the first connector hole 66 is shown as a substantially elliptical or slotted shape; however, the first connector hole 66 may be of any shape or size. The first connector hole 66 should be substantially centrally located in the lower area of the gusset 58.

Referring to FIG. 6, the tongue 100 is comprised of a toe front 118, a toe rear 134, a toe portion 101 extending from the toe front 118 to the toe rear 134, and a tongue connection portion 102 having a receptacle 110, a flange rear 138, and the hitch 140. Referring to FIGS. 6, 7, and 8, the tongue connection portion 102 is connected to the toe portion 101 at the toe rear 134 and extends to the distal end 142 of the hitch 140. Referring to FIGS. 6 and 7, the toe portion 101 further comprises a ramp 119, a pocket 130, and a cooling fin 108 having a cooling fin front 107 and a cooling fin rear 109. In FIG. 6, the ramp 119 is an asymmetrically shaped wedge and extends from the toe front 118. The pocket 130 is shown on FIGS. 1, 6, and 7 positioned between the toe front 118 and the cooling fin front 107; however, the pocket 130 may be positioned at any location in the tongue 100 between the ramp 119 and the cooling fin rear 109. The cooling fin 108 should be substantially centered on the longitudinal axis of the toe portion 101. The pocket 130 is shown in FIGS. 6 and 7 shown having a curvilinear shape; the pocket 130 should have a radius substantially equal to or less than the radius of the railcar wheel 30 to be engaged in the pocket 130, but the pocket 130 may have any curvilinear shape. The cooling fin 108 may also optionally include additional ridges or holes to increase its ability to dissipate heat. Locating the cooling fin 108 in the tongue 100 provides a substantial mass to act as a heat sink and stiffens the tongue 100 to resist bending, curling, and breakage. Positioning the pocket 130 in the cooling fin 108 provides direct contact with the cooling fin 108 and more effective heat distribution in the cooling fin 108. The toe portion 101 or the ramp 119 may be of any transverse cross-sectional shape.

Referring to FIGS. 6 and 8, the toe portion 101 is further comprised of a third friction surface 105 and a fourth friction surface 160. Referring to FIG. 6, the third friction surface 105 extends from the toe front 118 along the toe portion 101 through the pocket 130 and along the cooling fin 108 to the cooling fin rear 109. Referring to FIG. 8, the fourth friction surface 160 extends from the toe front 118 along the toe portion 101 and the tongue connection portion 102 to the flange rear 138 on an underside of the tongue 100.

Referring to FIG. 6, the tongue connection portion 102 comprises a pair of flanges 103, the receptacle 110, and a wall 145. Referring to FIGS. 6, 7, and 8, each of the pair of flanges 103 are mounted on opposite sides of the tongue connection portion 102 substantially perpendicular to the fourth friction surface 160 and may extend along substantially the entire tongue connection portion 102. Each flange 103 may also include a projection 104 as shown in FIGS. 1 and 6. Each projection 104 is substantially equidistant from the toe rear 134. Referring to FIGS. 6, 7, and 8, the receptacle 110 is substantially rectangular shaped and is centrally formed between the pair of flanges 103 and is substantially flush with the wall 145. Referring to FIG. 6, the wall 145 is substantially U-shaped and formed around a portion of the receptacle 110. While FIGS. 6 and 7 show the wall 145 being substantially U-shaped, wall may be semi-circular, partially elliptical, partially square, or any other geometric shape. Referring to FIG. 6, the wall 145 further includes a second connector hole 147 and a third connector hole 148. The wall 145 is substantially perpendicular to the fourth friction surface 160 and is integrally formed into the tongue connection portion 102 and the cooling fin 108 as shown in FIG. 6. The wall 145 must be substantially U-shaped or remain substantially open on one side such that it does not contact or interfere with the rotation of the base 40 and the tongue 100 to a position wherein the first friction surface 55 and the fourth friction surface 160 are substantially coplanar or flush. While FIGS. 6 and 7, show the second connector hole 147 and the third connector hole 148 partially disposed in the tongue connection portion 102, the second connector hole 147 and the third connector hole 148 may be fully disposed in the wall 145. The second connector hole 147 and/or the third connector hole 148 may include a recess where the connector means 170 for securely attaching the base 40 to the tongue 100 is a hex head nut or bolt.

Several elements of the present invention cooperate with each other to detachably connect the base 40 to the tongue 100. Specifically, the hitch 140 cooperates with the receiver 80 and the post 90 cooperates with the wall 145 and the receptacle 110 to detachably connect the base 40 to the tongue 100. Because the post 90 cooperates with the wall 145 and the receptacle 110 they must be of the same shape to fit together. As shown in FIG. 9, the hitch 140 is accepted into the receiver 80. Similarly, FIG. 1 shows the hitch 140 in cooperation with the receiver 80 along with the post 90 in cooperation with the wall 145 and the receptacle 110. As shown in FIGS. 2, 4, 5, 6, 7, 8, and 11 the base 40 and the tongue 100 include a base mating surface 155 and the tongue 100 includes a tongue mating surface 150. Either of the base mating surface 155 and the tongue mating surface 150 may only be partially shown in any figure. The base mating surface 155 and the tongue mating surface 150 may further comprise abutments, channels, grooves, shoulders, steps, or chamfers that further cooperate with each other. The abutments, channels, grooves, shoulders, steps, or chamfers may engage each other when the base 40 and the tongue 100 are detachably connected.

Figure 10:
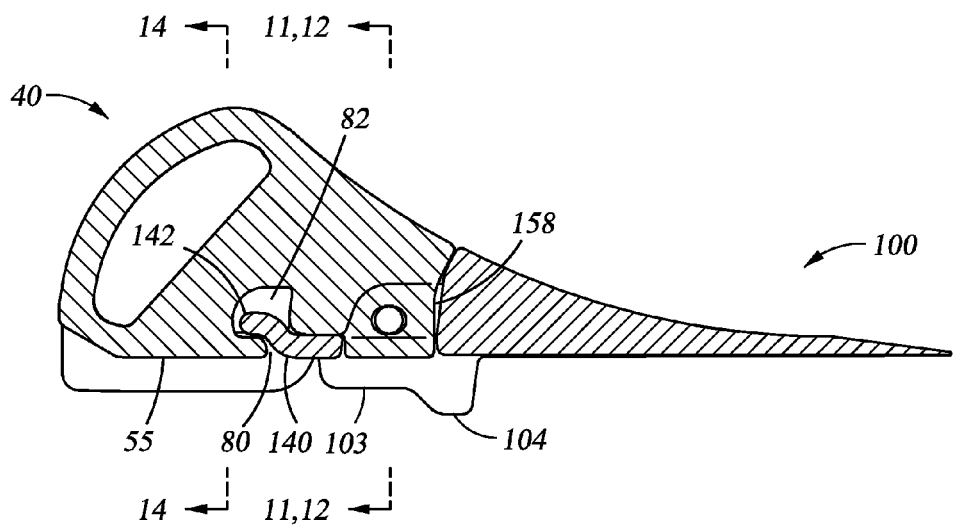
FIG. 10 is a longitudinal cross-section of one embodiment of the present invention.

Referring to FIG. 9, a user may assemble the rail skate 10 and understand the detachable connection of the base 40 to the tongue 100. Specifically, the receiver 80 is configured to accept the hitch 140 in a first relative orientation as the base 40 and the tongue 100 are moved toward each other. The receiver 80 will accept the hitch 140 with a reverse S-shaped configuration as the base 40 and the tongue 100 are positioned in a first relative orientation, wherein the tongue 100 is angled relative to the base 40 with respect to the first friction surface 55 first and the fourth friction surface 160. After the hitch 140 is accepted into the receiver 80, rotation of the base 40 and the tongue 100 relative to each other and with respect to the first friction surface 55 first and the fourth friction surface 160, the post 90 is received into the wall 145 and further engaged in the receptacle 110 and the tongue 100 to the base 40 become detachably connected, wherein the first friction surface 55 and the fourth friction surface 160 are substantially coplanar or flush and the first connector hole 66, the second connector hole 147, and the third connector hole 148 are aligned as shown in FIG. 10.

Figure 11:
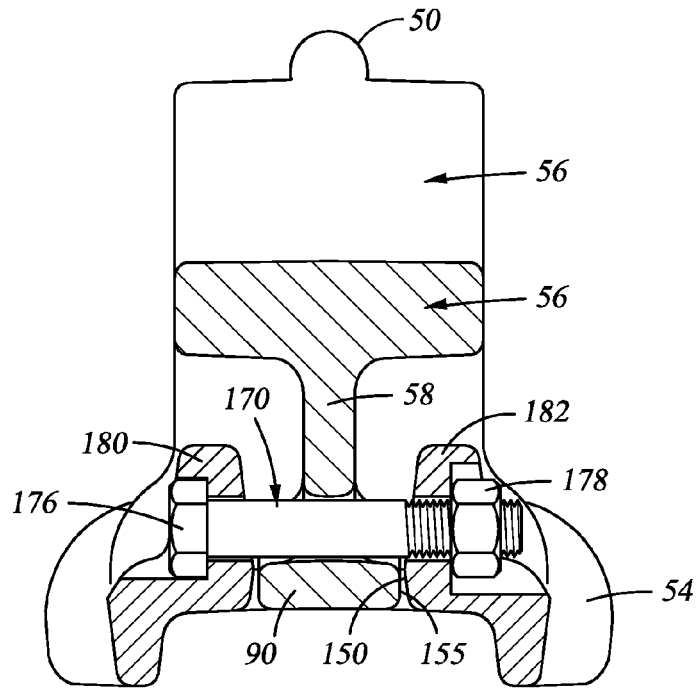
FIG. 11 is a cross section of an assembled rail skate in accordance with the present invention showing one embodiment of the connector means.
Figure 12:
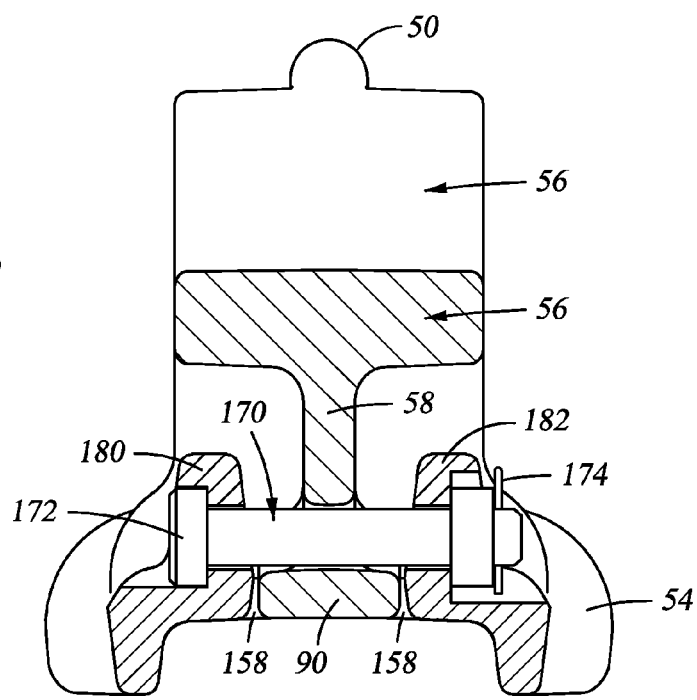
FIG. 12 is a cross section of cross section of assembled rail skate in accordance with the present invention showing another embodiment of the connector means.
Figure 13:
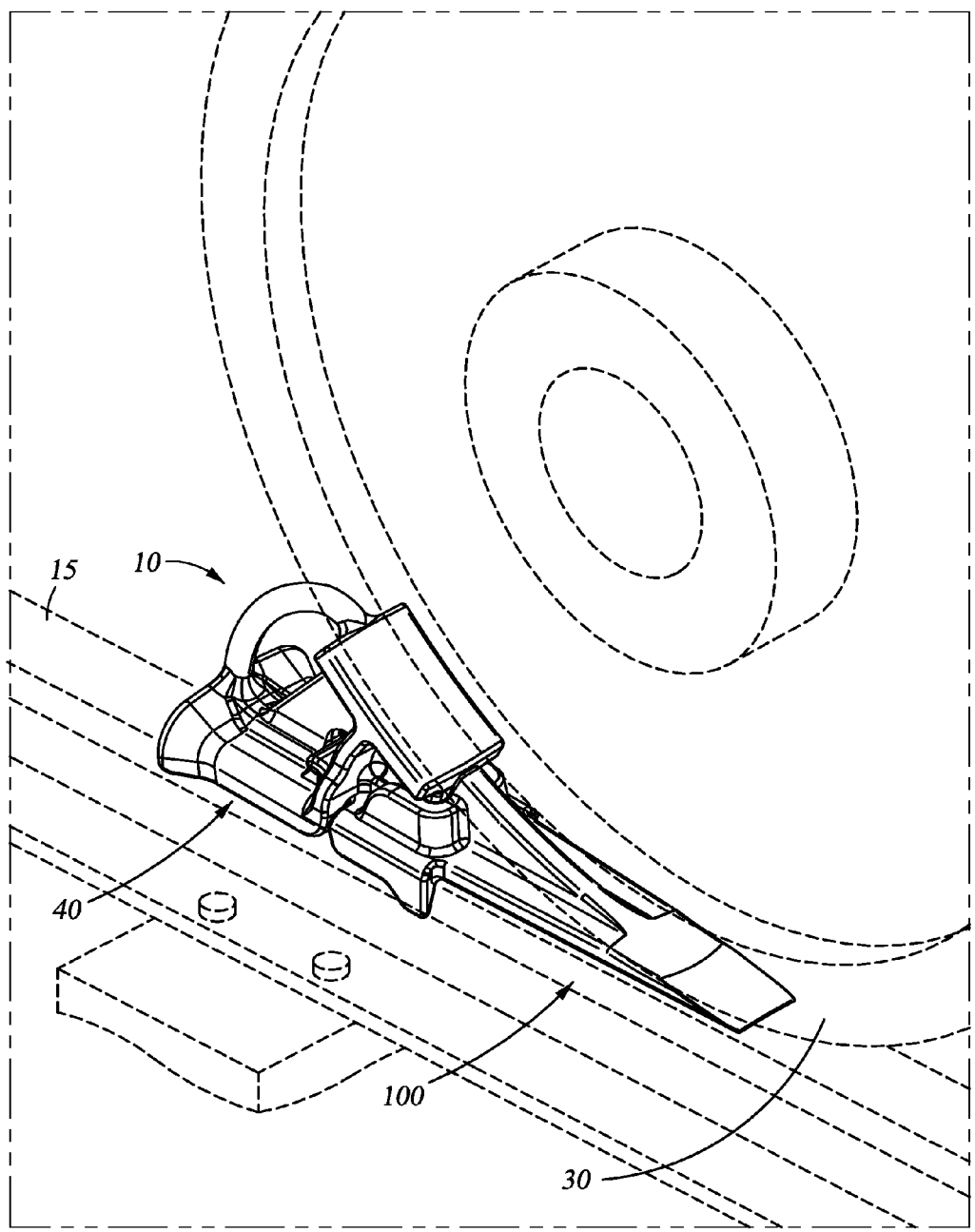
FIG. 13 is a perspective view of one embodiment of the present invention positioned on a rail showing another embodiment of the wall.
Figure 14:
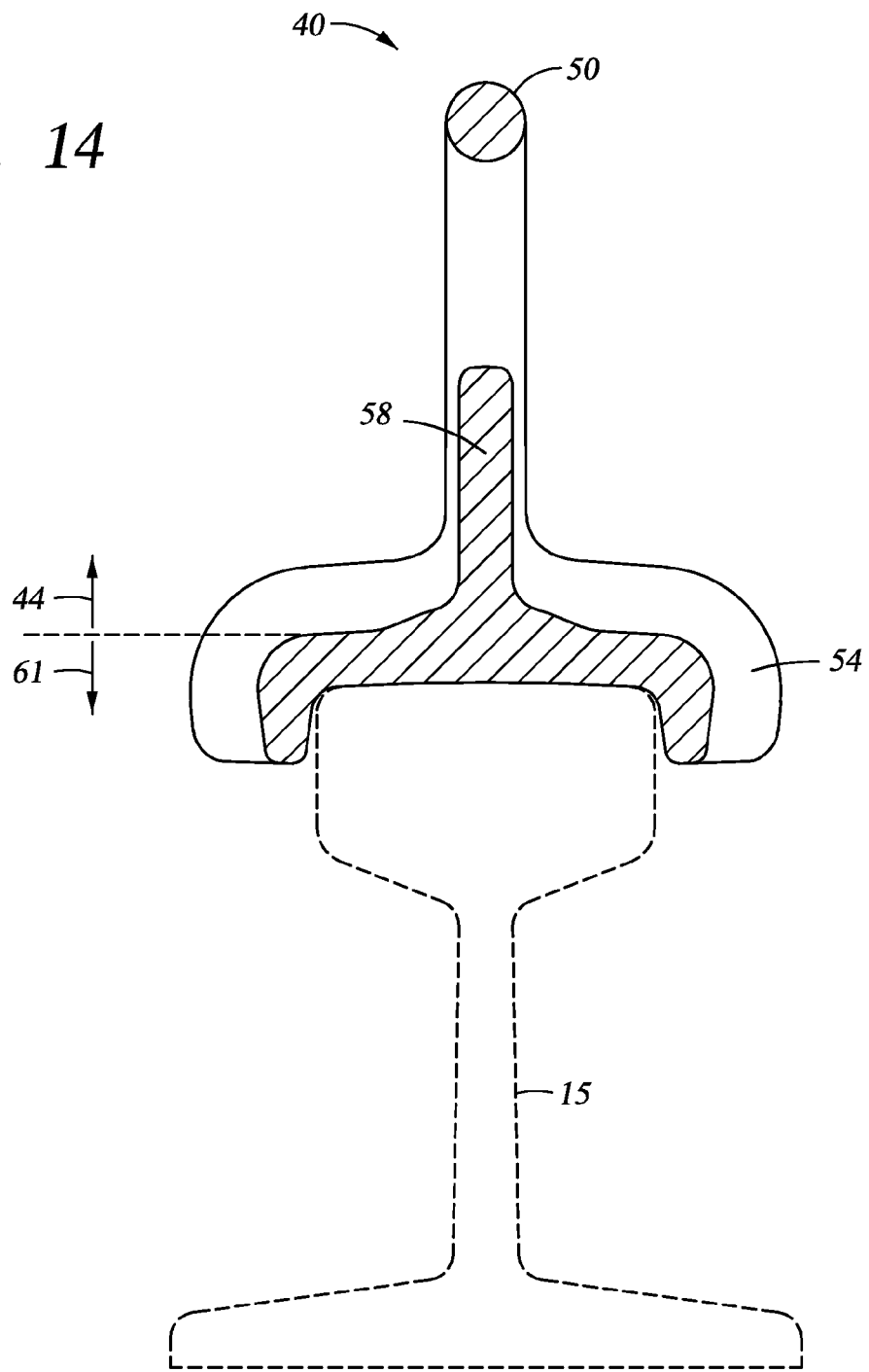
FIG. 14 is a cross section of an assembled rail skate in accordance with the present invention showing the base positioned on a rail.

While the cooperation of the hitch 140 and the receiver 80 along with the additional cooperation of the post 90 with the wall 145 and the receptacle 110 detachably connects the base 40 to the tongue 100 and does not require any welding, bolting, connector, or any further restraint or connection as shown in FIG. 13, it may be desirable to securely attach the base 40 to the tongue 100. As shown in FIGS. 1, 11, and 12, the rail skate 10 includes the connector means 170 for securely attaching the base 40 to the tongue 100. Referring to FIGS. 11 and 12, the connector means 170 for securely attaching the base 40 to the tongue 100 may include a clevis 172 and a cotter key 174, a split pin, a cotter pin, an R-clip, a bowtie cotter pin, or a circle cotter; a bolt 176 and a nut 178; or drift pin. The connector means 170 for securely attaching the base 40 to the tongue 100 may be of any cross-sectional shape and made of any suitable metal such as carbon steel. The cross-sectional shape of the connector means 170 for securely attaching the base 40 to the tongue 100 should correspond to the cross-sectional shapes of the first connector hole 66, the second connector hole 147, and third connector hole. Regardless of shape, the first connector hole 66, the second connector hole 147, and the third connector hole 148 must have substantially a one eighth (⅛) inch clearance over the connector means 170 for securely attaching the base 40 to the tongue 100 for easy insertion and removal of the connector means 170 for securely attaching the base 40 to the tongue 100. With the first connector hole 66, the second connector hole 147, and the third connector hole 148 aligned, a user may insert the connector means 170 for securely attaching the base 40 to the tongue 100. The connector means 170 for securely attaching the base 40 to the tongue 100 maintains the detachable connection of the base 40 and the tongue 100 under variances in loads and dynamic loading arising from track unevenness, wear, deflection, and other similar physical deformations. Because the base 40 is reusable and because the base 40 may be easily disassembled from the tongue 100 and attached to a new tongue 100, the connector means 170 for securely attaching the base 40 to the tongue 100 may be attached to the base 40 by a chain 48. Attaching the connector means 170 for securely attaching the base 40 to the tongue 100 with the chain 48 facilitates the easy disassembly and allows a user to conveniently disassemble the rail skate and carry the base 40 and the tongue 100 without losing the connector means 170 for securely attaching the base 40 to the tongue 100.

In operation, referring to FIG. 1, a user places rail skate 10 on a rail 15. The rail skate 10 is held in an upright position by one pair of guides 60 and the pair of flanges 103 and an integrally formed pair of projections 104. After the railcar wheel 30 is engaged with rail skate 10, the guide portion 61 steers as the rail skate 10 frictionally slides along rail 15. During this frictional engagement, the flare 54 steers the rail skate 10 along the rail 15. Particularly, the flare 54 allows the rail skate 10 to transition unevenness in the rail 15, rail defects, and joints or other gaps in rails. The flare 54 also prevents the rail skate 10 from snagging or hanging on any obstructions in the rail 15. The pair of guides 60, similar to the flare 54, also steer the rail skate 10 along the rail 15. The pair of flanges 103 and projections 104 also steer and support the rail skate in an upright position. The pair of guides 60, flanges 103, and projections 104 should have a clearance of substantially one-quarter (¼) inch on each side of the rail 15 and may slidably contact the rail but are not intended to function as a part of the friction surfaces that slow or impede the travel of the railcar. Additionally, referring to FIG. 9, the projections 104 are not shown; however, the projections 104 are not required to carry out the invention. However, where the projections 104 are included, they beneficially retain the rail skate 10 on the rail 15 where the tongue 100 has become curled and the rear end 46 is raised from rail 15 as the railcar wheel 30 rolls onto the ramp 119.

Referring to FIGS. 2, 3, and 4, the base 40 may also include an optional handle 50. The handle 50 may be formed between the flare 54, the rear end 46, or top plate and the inline top 57. The handle 50 is shown having a circular cross section, but it may have any cross-sectional shape and may include finger or hand grip features. The handle 50 may also be formed in the gusset 58.

The radius of the incline 56 and the cooling fin 108 should substantially match the radius of the railcar wheel 30 to be engaged with the rail skate 10. Referring to FIG. 1, the transition between the incline bottom 64 and the cooling fin rear 109 should be substantially tangent to each other such that the incline 56 and the cooling fin 108 have a smooth transition and substantially match the radius of the railcar wheel 30 to be engaged with the rail skate 10. Overall height of the incline top 57 should be less than one-half (½) of the radius of the railcar wheel 30 to be engaged. For improved engagement of the railcar wheel 30, the incline 56 may have a shorter radius than the cooling fin 108 to decrease the likelihood of the railcar wheel 30 otherwise jumping over rail skate 10.

Referring to FIGS. 1, 2, 6, and 11 the clearance between the base mating surface 155 and the tongue mating surface 150 should a minimum of one-sixteenth inch (1/16) to a maximum of one-quarter (¼) inch. Referring to FIGS. 1, 10, 11, and 12, the assembled rail skate 10 also includes an air gap 158 formed between the base mating surface 155 and the tongue mating surface 150 extending from the incline bottom 64 and the cooling fin rear 109 and between the front end 42 and the wall 145 and the post 90 and the receptacle 110. This air gap 158 insulates the base 40 from heat generated in the tongue 100 and allows for expansion of the tongue 100 during heating. As shown in FIGS. 1 and 10, the hitch 140 may contact the top plate 63 to maintain the air gap 158, and while FIGS. 1 and 10 do not show the distal end 142 in contact with the gusset slot 182, the distal end 142 may also contact the gusset slot 182 to maintain the air gap 158.

In a second embodiment, referring to FIGS. 8 and 9, the rail skate 10 is not forged, rather the rail skate 10 is cast. One significant difference is that the toe portion 101 includes a first mount 180 having a first mount connector hole 187 and a second mount 182 having a second mount connector hole 188. The first mount 180 and the second mount 182 should be substantially parallel to each other and substantially perpendicular to the longitudinal sides of the receptacle 110. The first mount connector hole 187 and/or the second mount connector hole 188 may include a recess where the connector means 170 for securely attaching the base 40 to the tongue 100 is a hex head nut or bolt. FIG. 9 shows the first mount connector hole 187 having a recess for a hex head nut or bolt. Similar to other embodiments, the hitch 140 and the receiver 80 cooperate with each other along with the post 90, the first mount 180, the second mount 182, and the receptacle 110 to detachably connect the base 40 to the tongue 100. Additionally, as shown in FIG. 9, the pair of post lateral supports 94 partially extend from the top plate 63 to the front end 42, but not to the incline 56. Regardless of shape, the first mount connector hole 187 and/or the second mount connector hole 188 must have a one eighth (⅛) inch clearance over the connector means 170 for securely attaching the base 40 to the tongue 100 for easy insertion and removal of the connector means 170 for securely attaching the base 40 to the tongue 100.

All parts of the rail skate 10 may be integrally formed, cast, forged, or fabricated, connected, or mounted by welding. Where the tongue 100 is forged, the second connector hole 147 and the third connector hole 148 hole must be machined or drilled. In FIGS. 1 through 8, the wall 145 should be made as a solid unit, which may be practically accomplished by casting or forging; however, forging the first mount 180 and/or the second mount 182 shown in FIG. 9 is not practical.

All parts of the rail skate 10 may be made of a suitable metal as required for carrying out the invention. Generally, carbon steel and Austempered Ductile Iron ("ADI") are suitable metals as a casting metal material or a forged metal material, but any metals with a similar hardness, yield, bearing, and tensile strengths are suitable for carrying out the invention. ADI provides a high strength and wear resistant material at lower price than steel. The railroad industry has used ADI for suspension housings, top caps and friction wedges, track plates, repair vehicle wheels, nipper hooks, and railcar wheels. The tongue 100 and base may be manufactured from the same or differing materials. More specifically, the base 40 and/or the tongue 100 may be cast manufactured to ASTM A897 Grade 3 or reference Grade 3 or 175/125/04 having a minimum tensile strength of 175 kips per square inch; minimum yield strength of 125 kips per square inch; minimum elongation percentage in 2 inches of 4%; impact energy of 45 foot-pounds; and a Brinnell hardness ("HBW") range of 341-444 kilograms/millimeter, where the unnotched charpy bars are tested at 22±4° C. and the value is a minimum for the average of the highest three test values of the four tested samples or SAE J434 Grade D4018 having a minimum tensile strength of 58 kips per square inch; minimum yield strength of 40 kips per square inch; minimum elongation percentage in 2 inches of 18%; impact energy of 90 foot-pounds; and a HBW range of 143-170 kilograms/millimeter, where the unnotched charpy bars are tested at 22±4° C. and the value is a minimum for the average of the highest three test values of the four tested samples. In addition to making the rail skate 10 from a cast material; the tongue 100 may be forged. For example, the base 40 may be manufactured to ASTM A897 Grade 3 or SAE J434 Grade D4018 and detachably connected to the tongue 100 forged from Grade 1030 or Grade 1035 carbon steel.

Generally any protective or corrosion coatings or paint may be applied to the rail skate 10. A friction coating 162 may be applied to the first friction surface 55, the second friction surface 62, the third friction surface 105, and the fourth friction surface 160 to increase the coefficients of static and kinetic friction. However, the first friction surface 55, the second friction surface 62, the third friction surface 105, and the fourth friction surface 160 cannot be painted or have any coating applied which might reduce the friction between the railcar wheel 30 and/or a rail 15.

The rail skate 10 is commonly placed on a single rail, but rail skates may be placed on two rails and may be physically connected to cooperate with each other in side-by-side relation for additional frictional resistance if desired. Rail skates may also be placed on a single or two rails and spaced apart a predetermined distance in tandem with each other as a contingency that the rail skate 10 which first contacts the railcar wheel 30 becomes displaced from the rail 15.

The overall length of the rail skate 10 should be between eighteen (18) inches and thirty six (36) inches and the base 40 from the front end 42 to the rear end 46 should be about twelve (12) inches of this dimension and the tongue 100 from the toe front 118 to the distal end 142 of the hitch 140 should be about twenty (20) inches. If the rail skate 10 is longer than the span between wheels on the railcar it will support more than one railcar wheel or could become lodged between wheels.

All patents and publications referred to herein are hereby incorporated by reference in their entireties.

Having described the invention above, various modifications of the techniques, procedures, materials, components, and equipment will be apparent to those skilled in the art. It is intended that all such variations within the scope and spirit of the invention be included within the scope of the rail skate 10 described in the claims.

What is claimed is:

1. A friction rail skate comprising:
a base having a front end and a rear end;
a tongue having a toe front, a too rear, and a ramp, said ramp adjacent to said toe front;
said base having a guide portion for supporting and frictionally steering along a rail and a gusset connection portion for cooperating with and detachably connecting said base to said tongue; said gusset connection portion on top of said pride portion;
said tongue having a toe portion for receiving and engaging a railcar wheel and a tongue connection portion, said toe portion and said tongue connection portion adjacent to said toe rear for cooperating with and detachably connecting said base to said tongue;
said guide portion includes a pair of guides on opposite sides of said guide portion and extending substantially directionally opposite said gusset connection portion and a top plate having a receiver;
said tongue connection portion includes a wall, a receptacle, a cooling fin having a cooling fin front and a cooling fin rear, said cooling fin on top of said toe portion with said cooling fin front between said ramp and said cooling fin rear in said wall and substantially flush with said wall and said receptacle, and a hitch in said tongue connection portion for communicating with said receiver, said receptacle located between said hitch and said toe rear, said wall substantially adjacent to said receptacle and projecting upward substantially perpendicularly from said tongue connection portion;
said gusset connection portion includes a gusset in said top plate for stiffening said base having a gusset slot for cooperating with said receiver and accepting said hitch, an incline having an incline top, said incline on top of said gusset for engaging and retaining a railcar wheel, and a post in said front end of said base and said gusset for communicating with said receptacle and said wall;
said base detachably connected to said tongue.

2. The friction rail skate as claimed in claim 1, further comprising
a connector means for securely attaching said base to said tongue;
said gusset having a first connector hole for receiving said connector means for securely attaching said base to said tongue;
said wall is substantially U-shaped and includes a second connector hole and a third connector hole disposed in said wall, said second connector hole and said third connector hole are substantially opposite of each other for aligning with said first connector hole and receiving said connector means for securely attaching said base to said tongue.

3. The friction rail skate as claimed in claim 2, further comprising a pair of lateral supports; said pair of lateral supports on top of said top plate and opposite sides of said gusset and extending under said incline for stiffening said base and laterally supporting said incline and said gusset.

4. The friction rail skate as claimed in claim 3, wherein said tongue connection portion includes a pair of flanges; said pair of flanges on opposite sides of said tongue connection portion for cooperating with said pair of guides in steering along a rail.

5. The friction rail skate as claimed in claim 4, wherein said pair of flanges further includes a pair of projections, said projections in the bottom of each of flange for beneficially retaining contact with a rail.

6. The friction rail skate as claimed in claim 5, wherein said guide portion includes a flare for steering along a rail, said flare in the rear end of said base for cooperating with said pair of guides, said flanges, and said projections.

7. The friction rail skate as claimed in claim 6, further comprising
a pair of post lateral supports in said gusset connection portion substantially perpendicular to said gusset and on opposite sides of said gusset and extending from said top plate along said front end substantially to said incline for stiffening said post.

8. The friction rail skate as claimed in claim 7, further comprising
a handle between said flare and said incline for ease in handling.

9. The friction rail skate as claimed in claim 8, wherein said base includes a base mating surface located substantially on said gusset connection portion;
said tongue includes a tongue mating surface located substantially on said tongue connection portion;
an air gap is included between said base mating surface and said tongue mating surface for flexibility and cooling.

10. The friction rail skate as claimed in claim 9, wherein said hitch includes a distal end for resting against said gusset slot and maintaining said air gap between the said base mating surface and said tongue mating surface.

11. The friction rail skate as claimed in claim 10, further comprising
a pocket, said pocket in said toe portion between said ramp and said cooling fin front.

12. The friction rail skate as claimed in claim 11, further comprising
a pocket, said pocket in said cooling fin between said cooling fin front and said cooling fin rear.

13. The friction rail skate as claimed in claim 11, wherein at least said base is made of a cast metal material.

14. The friction rail skate as claimed in claim 11, wherein at least said tongue is made of a forged metal material.

15. The friction rail skate as claimed in claim 11, wherein said base and said tongue are made of a cast metal material.

16. The friction rail skate as claimed in claim 12, wherein at least said base is made of a cast metal material.

17. The friction rail skate as claimed in claim 12, wherein at least said tongue is made of a forged metal material.

18. The friction rail skate as claimed in claim 12, wherein said base and said tongue are made of a cast metal material.

19. The friction rail skate as claimed in claim 13, wherein said cast metal material is austempered ductile iron having a minimum tensile strength of 175 kips per square inch; minimum yield strength of 125 kips per square inch; minimum elongation percentage in 2 inches of 4%; impact energy of 45 foot-pounds; and a Brinnell hardness range of 341-444 kilograms/millimeter.

20. The friction rail skate as claimed in claim 13, wherein said cast metal material is austempered ductile iron having a minimum tensile strength of 58 kips per square inch; minimum yield strength of 40 kips per square inch; minimum elongation percentage in 2 inches of 18%; impact energy of 90 foot-pounds; and a Brinnell hardness range of 143-170 kilograms/millimeter.

21. The friction rail skate as claimed in claim 14, wherein said forged metal material is grade 1030 carbon steel.

22. The friction rail skate as claimed in claim 14, wherein said forged metal material is grade 1035 carbon steel.

23. The friction rail skate as claimed in claim 10, wherein said connector means for securely attaching said base to said tongue is a clevis and a cotter pin.

24. The friction rail skate as claimed in claim 7, wherein said connector means for securely attaching said base to said tongue is a bolt and a nut.

25. A friction rail skate comprising:
a base having a front end and a rear end;
a tongue having a toe front, a toe rear, and a ramp, said ramp adjacent to said toe front;
said base having a guide portion for supporting and steering along a rail and a gusset connection portion for cooperating with and detachably connecting said base to said tongue; said gusset connection portion on top of said guide portion;
said guide portion includes a pair of guides on opposite sides of said guide portion and extending substantially directionally opposite of said gusset connection portion and a top plate having a receiver; said guide portion includes a flare for steering along a rail, said flare in the rear end of said base;
said tongue having a toe portion for receiving and engaging a railcar wheel and a tongue connection portion, said toe portion adjacent to said tongue connection portion for cooperating with and detachably connecting said base to said tongue;
said toe portion includes a cooling fin for engaging the railcar wheel having a cooling fin front and a cooling fin rear, said cooling fin on top of said toe portion with said cooling fin front between said ramp and said cooling fin rear;
said tongue connection portion includes a hitch for communicating with said receiver, a receptacle located between said hitch and said toe rear;
said gusset connection portion includes a gusset in said top plate for stiffening said base having a gusset slot for cooperating with said receiver and accepting said hitch, an incline having an incline top, said incline on top of said gusset for engaging and retaining the railcar wheel, and a post in front end of said base and said gusset for communicating with said receptacle;
a pair of post lateral supports in said gusset connection portion substantially perpendicular to said gusset and on opposite sides of said gusset and at least partially extending from said top plate to said front end for stiffening said post;
a handle between said flare and said incline for ease in handling;
said tongue connection portion includes a first mount and a second mount substantially parallel to each other and projecting upward from said tongue connection portion and substantially perpendicular to and adjacent to said receptacle; said first mount having a first mount connector hole disposed in said first mount and said second mount having a second mount connector hole, said second mount connector hole disposed in said second mount substantially opposite of each other;

said base detachably connected to said tongue.

26. The friction rail skate as claimed in claim 25, wherein said base includes a base mating surface located substantially on said gusset connection portion;
said tongue includes a tongue mating surface located substantially on said tongue connection portion;
an air gap is included between said base mating surface and said tongue mating surface for flexibility and cooling.

27. The friction rail skate as claimed in claim 26, wherein said hitch includes a distal end for resting against said gusset slot and maintaining said air gap between the said base mating surface and said tongue mating surface.

28. The friction rail skate as claimed in claim 27, further comprising
a pocket, said pocket in said toe portion between said ramp and said cooling fin front.

29. The friction rail skate as claimed in claim 27, further comprising
a pocket, said pocket in said cooling fin and between said cooling fin front and said cooling fin rear.

30. The friction rail skate as claimed in claim 28, wherein said base and said tongue are made of a cast metal material.

31. The friction rail skate as claimed in claim 30, wherein said cast metal material is austempered ductile iron having a minimum tensile strength of 175 kips per square inch; minimum yield strength of 125 kips per square inch; minimum elongation percentage in 2 inches of 4%; impact energy of 45 foot-pounds; and a Brinnell hardness range of 341-444 kilograms/millimeter.

32. The friction rail skate as claimed in claim 29, wherein said base is cast from austempered ductile iron having a minimum tensile strength of 175 kips per square inch; minimum yield strength of 125 kips per square inch; minimum elongation percentage in 2 inches of 4%; impact energy of 45 foot-pounds; and a Brinnell hardness range of 341-444 kilograms/millimeter and said tongue is cast from austempered ductile iron having a minimum tensile strength of 58 kips per square inch; minimum yield strength of 40 kips per square inch; minimum elongation percentage in 2 inches of 18%; impact energy of 90 foot-pounds; and a Brinnell hardness range of 143-170 kilograms/millimeter.

33. A friction rail skate comprising:
a base having a front end and a rear end;
a tongue having a toe front, a toe rear, and a ramp, said ramp adjacent to said toe front;
said base having a guide portion for supporting and steering along a rail and a gusset connection portion for cooperating with and detachably connecting said base to said tongue; said gusset connection portion on top of said guide portion;
said guide portion includes a pair of guides on opposite sides of said guide portion and extending substantially directionally opposite of said gusset connection portion and a top plate having a receiver;
said tongue having a toe portion for receiving and engaging a railcar wheel and a tongue connection portion, said toe portion adjacent to said tongue connection portion for cooperating with and detachably connecting said base to said tongue;
said toe portion includes a cooling fin for engaging the railcar wheel having a cooling fin front and a cooling fin rear, said cooling fin on top of said toe portion with said cooling fin front between said ramp and said cooling fin rear;
said tongue connection portion includes a hitch for communicating with said receiver and a receptacle located between said hitch and said toe rear;
said gusset connection portion includes a gusset in said top plate for stiffening said base having a gusset slot for cooperating with said receiver and accepting said hitch, an incline having an incline top, said incline on top of said gusset for engaging and retaining the railcar wheel, and a post in said front end of said base and said gusset for communicating with said receptacle;
said tongue connection portion includes at least a first mount projecting upward from said tongue connection portion and substantially perpendicular to and adjacent to said receptacle; said first mount having a first mount connector hole;
said base detachably connected to said tongue.

34. The friction rail skate as claimed in claim 33, further comprising
a connector means for securely attaching said base to said tongue;
said gusset having a first connector hole for receiving said connector means for securely attaching said base to said tongue;
said first mount connector hole for aligning with said first connector hole and receiving said connector means for securely attaching said base to said tongue.

35. The friction rail skate as claimed in claim 34, further comprising
a pair of lateral supports; said pair of lateral supports on top of said top plate and opposite sides of said gusset and extending under said incline for stiffening said base and laterally supporting said incline and said gusset.

36. The friction rail skate as claimed in claim 35, wherein said guide portion includes a flare for steering along a rail, said flare in the rear end of said base.

37. The friction rail skate as claimed in claim 36, further comprising
a pair of post lateral supports in said gusset connection portion substantially perpendicular to said gusset and on opposite sides of said gusset and extending from said top plate along said front end substantially to said incline for stiffening said post.

38. The friction rail skate as claimed in claim 37, further comprising
a handle between said flare and said incline for ease in handling.

39. The friction rail skate as claimed in claim 38, wherein said base includes a base mating surface located substantially on said gusset connection portion;
said tongue includes a tongue mating surface located substantially on said tongue connection portion;
said friction rail skate includes an air gap between said base mating surface and said tongue mating surface for flexibility and cooling.

40. The friction rail skate as claimed in claim 39, wherein said hitch includes a distal end for resting against said gusset slot and maintaining said air gap between the said base mating surface and said tongue mating surface.

41. The friction rail skate as claimed in claim 40, further comprising
a pocket, said pocket in said toe portion between said ramp and said cooling fin front.

42. The friction rail skate as claimed in claim 40, further comprising
a pocket, said pocket in said cooling fin between said cooling fin front and said cooling fin rear.

43. The friction rail skate as claimed in claim 41, wherein said base and said tongue are made of a cast metal material.

44. The friction rail skate as claimed in claim 43, wherein said cast metal material is austempered ductile iron having a minimum tensile strength of 175 kips per square inch; minimum yield strength of 125 kips per square inch; minimum elongation percentage in 2 inches of 4%; impact energy of 45 foot-pounds; and a Brinnell hardness range of 341-444 kilograms/millimeter.

45. The friction rail skate as claimed in claim 42, wherein said base is cast from austempered ductile iron having a minimum tensile strength of 175 kips per square inch; minimum yield strength of 125 kips per square inch; minimum elongation percentage in 2 inches of 4%; impact energy of 45 foot-pounds; and a Brinnell hardness range of 341-444 kilograms/millimeter and said tongue is cast from austempered ductile iron having a minimum tensile strength of 58 kips per square inch; minimum yield strength of 40 kips per square inch; minimum elongation percentage in 2 inches of 18%; impact energy of 90 foot-pounds; and a Brinnell hardness range of 143-170 kilograms/millimeter.

* * * * *